2,808,378
REDUCTION OF ACID FOAMING IN ETHANOL SYNTHESIS

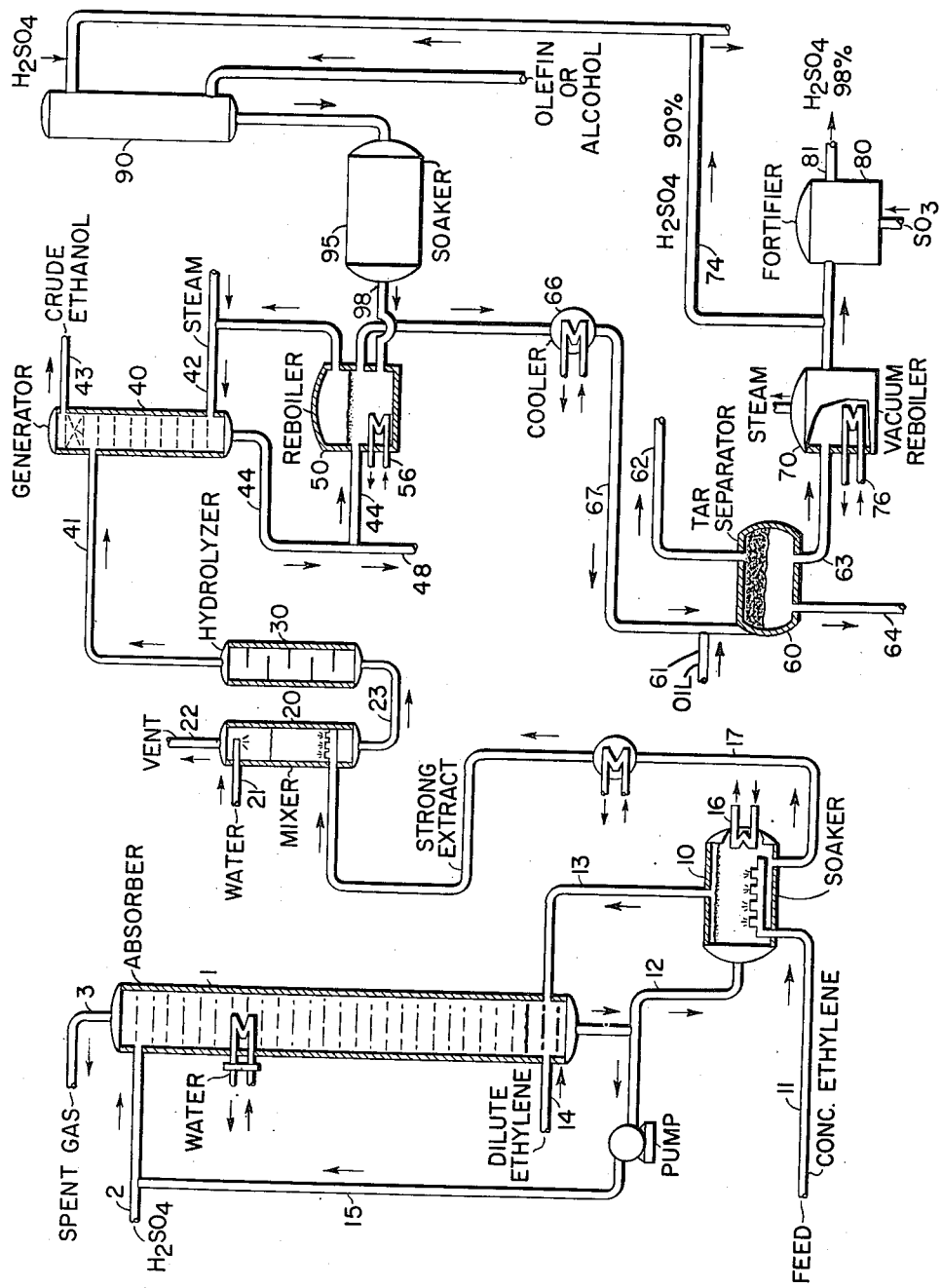

Francis P. Baldwin, Colonia, and Thomas H. Hakala, Union, N. J., assignors to Esso Research and Engineering Company, a corporation of Delaware Application August 27, 1954, Serial No. 452,689

12 Claims. (Cl. 252—321)

This invention relates to the manufacture of ethanol by absorption of ethylene in strong sulfuric acid and subsequent hydrolysis of the resulting extract. More specifically, the invention relates to the reduction of troublesome acid foaming in the acid reboilers customarily used for re-concentrating the spent acid in such alcohol manufacture. Still more particularly, it is based on the discovery that feeding a minor amount of an unhydrolyzed or incompletely hydrolyzed reaction product of strong sulfuric acid and a suitable $C_3$ or $C_5$ olefin or alcohol to the acid reboilers eliminates all foaming difficulties otherwise encountered therein.

The manufacture of ethanol from ethylene with the aid of strong sulfuric acid is a well-known process. The main steps of such a process usually include absorption of ethylene in about 95 to 99% sulfuric acid; dilution of the resulting extract with water to an acid strength of about 45 to 50%; hydrolysis; steam stripping the ethanol from the dilute acid; concentrating the dilute acid to about 65 to 75% strength in atmospheric reboilers; washing the acid with oil to remove tar and sludge; further concentrating the acid to about 90% strength in vacuum concentrators; and fortifying the acid back to its original strength with sulfur trioxide for subsequent recycling to the ethylene absorption stage of the ethanol plant.

However, one of the persistent difficulties in such alcohol processes has been the frequently excessive foaming of the acid in the reboilers, causing poor heat transfer, loss of a large proportion of the total reboiler capacity, and consequently incomplete reconcentration of the acid and a general impairment of the entire operation.

It appears that such foaming difficulties are due largely to surface active carbon-containing compounds. These materials are formed as by-products in the process and, despite some removal thereof in the oil washing stage, tend to concentrate in the sulfuric acid as the latter is recycled in the process. Expressed as percent carbon based on 100% sulfuric acid, these foam producing impurities in the acid stream may typically amount to about 0.3% in the acid stream being fed into the absorber; due to side reactions taking place in the process the concentration of these impurities may increase to about 1% in the steam-stripped dilute acid going from the alcohol generator to the atmospheric reboilers; and, due to sludge deposition and steam distillation of organic matter, the concentration of impurities may drop down again to about 0.5% in the intermediate strength acid leaving the atmospheric reboilers. The undesirable impurities are undoubtedly formed mainly as a result of the oxidizing action of the strong acid in the absorption step, followed by complex condensation and sulfonation reactions. Of course, it will be understood that the present invention is not limited by any hypothesis regarding the formation of these foam producing impurities. In this connection, it may be of interest to note that although propylene is a more reactive olefin than ethylene, foaming and fouling are not problems in isopropanol manufacture. This difference may well be attributable to the fact that 80% or weaker acid normally employed in isopropanol synthesis is not so strong an oxidizing agent as the more concentrated acid used in ethanol synthesis.

It is the main object of the present invention to eliminate the difficulties traceable to fouling and particularly to acid foaming in ethanol operations using strong sulfuric acid as a hydration agent. Another object is to prevent upsets and erratic operation of the acid reboilers and to maintain the evaporative capacity of such reboilers at a high level. Still another object is to provide a novel antifoamant which, unlike many conventional antifoamants, will cause no substantial complications in the alcohol recovery steps or elsewhere in the system.

In accordance with these objects it has now been discovered that certain reaction products of strong sulfuric acid with certain olefins or alcohols, and particularly such reaction products of propylene or isopropyl alcohol, can serve as an unusually effective antifoamant when introduced into the acid reboilers. The operation and advantages of this invention, as well as its general nature and scope, will become more clearly apparent from the subsequent illustrative description, especially when read with reference to the attached drawing and appended claims.

In reading the description, it should be noted that all ratios and percentages of materials are expressed throughout on a weight basis unless otherwise indicated.

The drawing represents a flow diagram of an ethanol plant embodying the present invention.

Referring to the drawing the invention will be illustrated in terms of a specific manufacturing operation employing hydration of ethylene with the aid of strong sulfuric acid. In this process concentrated ethylene gas feed is introduced into soaker 10 through line 11. This ethylene feed may be pure ethylene, but in commercial practice it will usually be a $C_2$ hydrocarbon fraction containing about 40 to 70 mole percent ethylene, the balance being mostly ethane accompanied by a small amount of up to about 5 mole percent of methane and a trace of up to about 0.5 mole percent of $C_3$ and higher hydrocarbons. Thus, for instance, the ethylene feed may contain about 3.2% $CH_4$; 65.7% $C_2H_4$; 31.1% $C_2H_6$; and less than 0.02% $C_3$ and higher hydrocarbons. In soaker 10 this concentrated ethylene feed is intimately contacted with the ethyl sulfate extract which is introduced into soaker 10 from primary absorption tower 1 through line 12. In this manner a part of the ethylene from feed stream 11 is absorbed in the extract in soaker 10 and the unabsorbed gas, which still may contain about 40 to 50 mole percent of ethylene, is then passed through line 13 into plate tower 1 where the ethylene absorption is substantially completed by contact with sulfuric acid. In addition a relatively dilute ethylene gas such as an extraneous refinery gas stream containing about 30 to 50 mole percent ethylene may also be introduced into tower 1 through line 14.

Sulfuric acid of at least about 90% strength (ethylene-free basis), e. g. 98% acid is introduced into the top of tower 1 via line 2 so that the acid passes countercurrently to the rising gas from which the ethylene is to be extracted. Spent gas is withdrawn from the top of tower 1 via line 3 and may be used as fuel, while the resulting ethylene extract is removed at the bottom via line 12 to be further fortified in soaker 10 as previously described. Furthermore it is desirable to recycle some of the extract from absorber 1 via line 15 to the acid inlet 2. The amount of such recycle to fresh acid is preferably such as to produce a feed acid mixture having a saturation of about 0.5, that is, containing about 0.5 mole of ethylene per mole of $H_2SO_4$. Such a mixture is greatly superior to straight sulfuric acid as an absorbent.

The extraction in absorption vessels 1 and 10 may be carried out at temperatures of about 60 to 100° C., e. g. 75° C., and at a pressure of about 100 to 500 p. s. i. g., e. g. 300 p. s. i. g. Heat of absorption may be removed from the absorption vessels in any convenient manner, e. g. with the aid of internal cooling coils 6 and 16 through which a coolant such as water may be circulated. The mole ratio of concentrated acid (as 100% $H_2SO_4$) in feed line 2 to total ethylene feed (as 100% $C_2H_4$) in lines 11 and 14 may range between about 0.6/1 to 0.9/1.

The resulting ethyl sulfate extract is passed from soaker 10 to mixer 20 via line 17 and may contain about 45.5% of diethyl sulfate, 38% ethyl hydrogen sulfate and 16.5% free sulfuric acid; it may have a saturation of about 1.2 to 1.5, e. g. 1.3. In mixer 20 the extract is mixed with enough water or dilute sulfuric acid to permit substantially complete hydrolysis of the ethyl sulfate extract into ethanol, ether, and acid. In customary practice this involves the addition of enough water through line 21 to reduce the acid strength to about 50% or less, e. g. to 48% on an ethylene-free basis. Any gas such as physically dissolved feed gases which may be evolved in mixer 20 may be vented via line 22. The resulting mixture is then passed to hydrolyzer 30 via line 23 and brought to equilibrium by soaking at a temperature of about 70 to 120° C. for a suitable period of time, e. g. about three hours at 100° C. or appropriately longer times at lower temperatures. After reaching equilibrium the mixture will contain essentially no diethyl sulfate.

The equilibrated aqueous extract is fed from hydrolyzer 30 to one or more generator towers 40 through line 41. Steam is also introduced into generator 40 through line 42 for the purpose of stripping liberated alcohol from the mixture and substantially completing the hydrolysis of any monoethyl sulfate present. With an acid strength of about 48% and at atmospheric pressure, the bottom plates of generator 40 may be operated at about 120° C. while keeping the top plate at about 90° C. Lower temperatures may be employed if the step is done under vacuum. The hydrolysis in generator 40 will normally be completed in about 0.5 to 5 minutes, e. g. in about 2 minutes. The amount of stripping steam is dictated primarily by the heat balance, enough steam being added to strip out essentially all of the ethanol produced and to raise the acid in the tower to its boiling point. The stripped out crude alcohol vapors which may contain about 50 mole percent of water are finally withdrawn from tower 40 via line 43 and recovered in a conventional manner which need not be described here in detail. For instance, the alcohol vapors may be scrubbed with caustic soda, condensed, passed through a first distillation column to remove ether therefrom, and finally rectified in an alcohol column.

The stripped dilute acid at 48% strength is withdrawn from generator tower 40 via line 44 and passed to one or more acid reboilers 50. At this stage the acid will contain about 0.8 to 1% of carbonaceous or carbon-containing impurities. These are the agents responsible for the harmful foaming normally encountered in the operation of the reboiler when the acid is concentrated therein by evaporation of some of the water. The heat required for the reboiling step can be supplied in any convenient manner, e. g. by circulating diphenyl through heating coil 56. The steam produced in this operation may be used for stripping in generator 40, being passed thereto through aforementioned line 42. Reboiler 50 is usually operated at atmospheric pressure and at a temperature of about 160° C., producing a dark colored acid of about 68% strength and a carbon content of about 0.4 to 0.5%. This acid, or at least a part thereof, is then usually cooled to about 40° C. in water cooler 66 and passed through line 67 to tar separator 60 where the acid can be washed with a minor proportion of an inert, acid immiscible flotation agent such as gas oil admitted via line 61 to float carbonaceous contaminants out of the acid. Other suitable wash liquids include kerosene, pine oil, and the like. About 2 volumes of wash oil per 100 parts of acid represent a suitable, though not by any means critical, ratio. As the mixture settles in separator 60, the oil layer which will contain a portion of the carbonaceous impurities may be withdrawn via line 62. The washed acid layer is noticeably lighter in color than the acid being fed into the tar separator, but still usually contains about 0.3 to 0.4% of carbon.

The washed acid is then passed through line 63 to one or more vacuum reboilers 70 where the acid is concentrated to a strength of about 90 to 91% at temperatures of about 150 to 175° C. and a pressure of about 25 to 125 mm. Hg. Here, also, some foaming is likely to occur, but usually is not nearly so troublesome as in the atmospheric reboilers. Finally, the 90% acid from the vacuum reboiler 70 is passed to one or more fortifying towers 80 where enough sulfur trioxide gas is added to bring the acid to the desired strength of about 98%. The resulting acid may be withdrawn via line 81 and returned via line 2 to the absorption step. Also, since the addition of extraneous sulfur trioxide for fortification produces a net increase in sulfuric acid inventory, surplus acid must be withdrawn from the system. For instance, this excess acid may be withdrawn at 68% strength via line 64, after washing in separator 60. However, if desired, the excess sulfuric acid may be withdrawn in any other form, e. g. via line 48 as 48% acid after hydrolysis in generator 40, or via line 74 as 90% acid after vacuum concentration in reboiler 70.

The description given thus far has related essentially to a conventional process. The features characterizing the present invention will now be described in connection therewith. Specifically, it has been discovered that if a suitable product obtained by reacting strong sulfuric acid with propylene or with isopropyl alcohol or certain higher homologs thereof is added to the acid in the reboilers, the foaming tendency of the acid is markedly reduced or completely eliminated.

It will be understood that these strong acid extracts are not simple alkyl sulfates. On the contrary, as hereafter described in greater detail, these extracts contain some organic oxidation and condensation products as essential ingredients thereof, in addition to free sulfuric acid, alkyl hydrogen sulfate and usually also dialkyl sulfate. Consequently, these acid extracts will hereafter be referred to generically as "oxidized alkyl sulfate extracts," since the strong sulfuric acid acts on the olefin or alcohol in part as an oxidizing agent as evidenced by the evolution of sulfur dioxide during the reaction.

For instance, a suitable oxidized alkyl sulfate extract having the desired foam-repressing properties may be prepared in a separate olefin hydration unit such as smaller tower 90 where the desired antifoamant may be produced by absorbing propylene or more generally an olefin or alcohol having 3 or a higher odd number of carbon atoms, e. g., amylene or isoamyl alcohol or an Oxo $C_5$ alcohol, in sulfuric acid of appropriate strength. For instance, when the isopropyl alcohol is used and the reaction is carried out at about 15 to 25° C., an acid strength of about 88 to 96% is suitable. But the reaction may also be carried out at higher temperatures, e. g. up to about 100° C., in which case an acid strength of about 85 to 93% is preferred. In the case of Oxo amyl alcohol, acid strengths of 85 to 93% are suitable when the reaction is carried out at room temperature. Generally speaking, sulfuric acid of about 90% strength will be suitable under most circumstances. In preparing the antifoamant it is desirable to use about 5 to 30 parts, or preferably about 10 to 15 parts, of the alcohol per 100 parts of the sulfuric acid reagent. A soaker 95 is desirably provided subsequent to absorber 90 as to provide adequate reaction time of about 1 to 15 hours. The minimum required reaction time will also depend somewhat on the reaction temperature and strength of acid used, but about 2 hours at 25° C. is satisfactory in the case of 90% acid. The resulting oxidized sulfate product is then passed to reboiler 50 via line 98. Though not usually necessary, some of the alkyl sulfate may also be supplied directly to the vacuum reboiler 70. The amount of oxidized alkyl sulfate extract required to repress foaming in the atmospheric reboilers according to the present invention may range from as little as 0.01% to about 5 or even 10% based on the total weight of liquid feed to the reboiler, depending somewhat on the foaming characteristics of the acid and the nature of the alkyl sulfate extract. The use of about 1 to 2% of oxidized alkyl sulfate based on reboiler acid feed is usually satisfactory. The oxidized alkyl sulfate retains its foam repressing potency over long periods of time.

When the aforementioned antifoamant effect of the oxidized alkyl sulfate extract was first discovered, it was believed that it might be the result of slow liberation of the alcohol by hydrolysis of the ester, inasmuch as alcohols have been used in the past as effective foam retarders in various other systems. Accordingly, instead of adding the isopropyl sulfate extract to the acid in the reboiler, about 2% of isopropyl alcohol was added as such. However, surprisingly, the alcohol had only a negligible temporary foam retarding effect and was entirely inadequate with respect to alleviating the operating difficulties resulting from excessive foaming in the reboiler. On the contrary, for reasons not yet fully understood, it appears that only certain oxidized alkyl sulfate extracts and notably oxidized isopropyl sulfate extracts, are uniquely effective as foam retarders in conjunction with spent sulfuric acid liquors which contain surface active carbonaceous impurities as a result of previous contact of strong sulfuric acid with gaseous or liquid unsaturated hydrocarbons.

In other words, though the present invention is not restricted by any particular hypothesis, it appears that neither the alcohol nor the alkyl sulfate itself, but the oxidation products formed under proper conditions are the ingredients principally responsible for foam repression and probably function by their tendency to concentrate at the surface. Naturally, in a continuous process the concentration of the oxidized alkyl sulfate extract is readily kept constant by continuous addition of fresh oxidized extract as described earlier herein. In batch evaporations the required minimum effective concentration can be maintained by periodic addition. The alcohol liberated in the reboiler of course passes with the steam and any other volatile impurities through aforementioned line 42 to generator 40 and is eventually recovered along with the main alcohol product evolved directly in the generator. For instance, when oxidized isopropyl sulfate extract is used as the foam represser, the resulting isopropyl alcohol and any regenerated propylene can be readily separated from the ethanol product in the conventional product finishing operations.

Of course, the present invention is applicable not only wherever the contaminated acid is being evaporated, but also when it is subjected to other conditions which are apt to cause foaming, e. g. mechanical agitation at 0° to 170° C., blowing with a gas such as ethylene feed in the absorber, etc.

The following examples will serve further to illustrate the nature and effectiveness of the present invention.

EXAMPLE I

To 75 ml. of 96.5% sulfuric acid (C. P.) were added 10 ml. of 99% isopropyl alcohol. The mixture was allowed to stand for seven days during which it first turned yellow, then red in a few hours and finally a very dark red-brown at the end of the first day. During the subsequent days the product did not appear to undergo any further changes in either appearance or foam repressing effectiveness.

The product was then tested as a foam repressant in two concentrations using a sulfuric acid taken from a commercial ethanol synthesis plant. The acid had a strength of 68% and contained 0.18% carbon. This acid was diluted to 48% strength with distilled water and the effect of the novel foam depressant on its foaming characteristics was tested.

The following apparatus and procedure were used in determining the foam characteristics of the several acid samples, with or without added foam repressant. The sample is placed in a glass test tube 16 inches high and 1⅞ inches outside diameter, the tube being provided with a 0.5-inch diameter side arm at a point 2⅝ inches from the top of the tube. The tube is closed at the top with a rubber stopper through which passes a narrow glass thermowell containing a thermocouple. The tube is graduated in 5 ml. increments to 500 ml. capacity, which capacity is reached at a point about 1¾ inches below the side arm. The tube is placed on a "Ful-Kontrol" heater which contains a variable transformer and a wattmeter in its circuit so as to permit exact control of heat input. The tube is shielded from drafts and air currents by a Transite chimney. To enhance reproducibility of results it is desirable to preheat the apparatus by distilling water for 15 minutes before carrying out the actual foaming tests. Of course, when a series of foaming tests is run in close sequence, such preheating is not required between consecutive tests. The preheated apparatus is charged with 100 ml. of test acid and three corborundum boiling chips of about 4 mesh. The chips aid in stabilizing the foaming tendency of the sample and prevent surging. The heat input is kept constant at a value equivalent to 95 volts and 5.5 amperes. As a result, when 48% acid is concentrated from 120 to 170° C. liquid temperature, the distillation is completed in about 21 to 23 minutes. The foam height is recorded at 5° C. intervals as the distillation temperature rises from 120 to 170° C. In the case of a badly foaming sample the whole tube is filled with foam and there is no liquid level. In the case of good acids the actual foam height equals the difference between the observed value and the volume of liquid not in the form of foam. In the case of a good acid this liquid volume originally is 100 ml. at 48% strength and is gradually reduced as water is evaporated during concentration.

The actual test results are shown below.

Table I

EFFECT OF ANTI-FOAMANT CONCENTRATION

| Anti-foamant g. Anti-foamant/100 ml. 48% Acid | Control 0 | 1 0.98 | 1 1.96 |
|---|---|---|---|
| Temperature, °C. | Foam Height, ml. | | |
| 125 | >500 | | |
| 130 | | 140 | 130 |
| 140 | | 210 | 155 |
| 150 | | 420 | 150 |
| 160 | | 410 | 155 |
| 170 | | 385 | 140 |
| | | 375 | 150 |

It is apparent that the addition of 1 or 2 percent of anti-foamant is effective in controlling the foaming of the acid. The 2% concentration was particularly effective.

EXAMPLE II

The following mixtures were prepared to illustrate the importance of proper acid strength in the preparation of the novel anti-foamants. The appreviation IPOH is used to designate isopropyl alcohol. All of the reaction products were prepared by mixing the indicated ingredients at 25° C. and allowing the mixture to stand for about 3 days.

ANTI-FOAMANT 2A. 10 ml. 99% IPOH+100 ml. 98.5% ethanol plant feed acid 2B. 10 ml. 99% IPOH + 100 ml. 91% ethanol acid plant product
2C. 10 ml. 99% IPOH+100 ml. 85% plant acid [1]
2D. 10 ml. 99% IPOH+100 ml. 80% plant acid [1]
2E. 10 ml. 99% IPOH+100 ml. 75% plant acid [1]
2F. 10 ml. 99% IPOH+100 ml. 68% ethanol cooler acid

[1] Prepared by dilution of 98.5% ethanol plant feed acid.

The data obtained with these products are shown in Table II.

Table II [1]
EFFECT OF REAGENT ACID CONCENTRATION ON QUALITY OF ANTI-FOAMANT

| Product ml. Product/100 ml. 48% Acid. | Control | 2A 2 | 2B 1 | 2B 2 | 2C | 2D | 2E | 2F |
|---|---|---|---|---|---|---|---|---|
| Temperature, °C. | Foam Height, ml. | | | | | | | |
| 140 | >500 | 150 | 175 | 100 | >500 | >500 | >500 | >500 |
| 145 |  | >500 | 175 | 115 |  |  |  |  |
| 150 |  |  | 160 | 115 |  |  |  |  |
| 155 |  |  | 140 | 120 |  |  |  |  |
| 160 |  |  | 125 | 125 |  |  |  |  |
| 165 |  |  | 115 | 125 |  |  |  |  |
| 170 |  |  | 110 | 130 |  |  |  |  |

[1] These and all remaining foam test data were obtained with 60% acid (B. P. 140° C.) although the concentration of product is still given in ml./100 ml. 48% acid since in actual practice 48% acid is fed into the reboilers. The volume of test acid used is identical with that which would be occupied by 100 ml. of 48% acid after concentration to 60% acid by water removal in the reboilers.

From the data in Tables I and II it is seen that in order to prepare this product at 25° C., it is required that the acid concentration be greater than 85% but less than 98.5%. For practical purposes then the acid from the vacuum reboilers before fortification with $SO_3$, that is having a strength of about 90%, would be especially well suited for preparing the novel anti-foamant.

Actually at higher temperatures a lower strength acid might be used. The reaction which produces the desired anti-foamant is in part at least an oxidation of the isopropanol. This is evidenced by the strong odor of $SO_2$ over the product. Hence the acid strength and temperature must be such that the oxidizing capacity is that defined by the aforementioned limits at 25° C.

To illustrate this point 10 ml. of isopropanol were added to 100 ml. of 80.5% sulfuric acid and the mixture heated to 80° C. and maintained at this temperature for 4.5 hours. Two milliliters of this product were then added to the test acid and the following data obtained:

| Temp., °C. | Foam Height, ml. |
|---|---|
| 140 | 150 |
| 145 | 180 |
| 150 | 200 |
| 155 | 250 |
| 160 | 260 |
| 165 | 265 |
| 170 | 300 |

Upon heating the product for an additional 3 hours and again testing in a 2 ml. product/100 ml. 48% test acid, the following data were obtained:

| Temp., °C. | Foam Height, ml. |
|---|---|
| 140 | 225 |
| 145 | 325 |
| 150 | 320 |
| 155 | 265 |
| 160 | 230 |
| 165 | 210 |
| 170 | 225 |

While the above data demonstrate the feasibility of using weaker acid to prepare this product, preparation of the product with the stronger (91%) acid at room temperature will usually be more economical.

EXAMPLE III

Having located the desirable acid concentrations for this invention, the effect of isopropanol concentration was next noted. The products were prepared as indicated below and tested. The test data are shown in Table III.

3A. 5 ml. 99% isopropanol/100 ml. 91% acid plant product
3B. 10 ml. 99% isopropanol/100 ml. 91% acid plant product
3C. 20 ml. 99% siopropanol/100 ml. 91% acid plant product Table III
EFFECT OF ALCOHOL CONCENTRATION ON ANTI-FOAMANT QUALITY

| Product ml. Product/100 ml. 48% Acid | Control | 3A 1 | 3A 2 | 3B 1 | 3C 1 |
|---|---|---|---|---|---|
| Temperature, ° C. | Foam Height, ml. | | | | |
| 140 | >500 | 260 | 130 | 175 | 90 |
| 145 |  | 250 | 135 | 175 | 90 |
| 150 |  | 240 | 130 | 160 | 95 |
| 155 |  | 265 | 125 | 140 | 95 |
| 160 |  | 265 | 130 | 125 | 100 |
| 165 |  | 250 | 120 | 115 | 105 |
| 170 |  | 220 | 120 | 110 | 100 |

From the above data it is seen that the concentration range 5–20 ml. isopropanol per 100 ml. of 91% acid is satisfactory and for a constant volume addition to the foaming acid product 3C is to be preferred. While there is here described no upper limit in isopropanol concentration one can be readily deduced. Considering the reaction below:

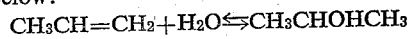
$$CH_3CH=CH_2 + H_2O \rightleftharpoons CH_3CHOHCH_3$$

it is seen that for every mole of isopropanol added there is effectively 1 mole of water added which serves to dilute the acid. In example 3C for instance, the acid strength is changed from 91% to 88.8% by this dilution. Hence if 50 ml. of isopropanol were added to 100 ml. of the 91% acid, the resulting acid strength would be 85.4% and this product on the basis of the data in Example 2 would not be as satisfactory as those shown in Example 3. Furthermore use of such a mixture would not be economically advantageous. Consequently, it is preferable to stay in the range of about 10 to 30 ml. of alcohol per 100 ml. acid. Of course, if aqueous rather than pure alcohol is used the volume used must be reduced so as to allow for the diluent effect of the extra water present.

EXAMPLE IV

In the previous example it has been indicated that isopropanol may be treated as the equivalent of propylene-water. On this basis it would be expected that the system propylene-91% sulfuric acid would yield a product equally desirable to that obtained with isopropanol. Accordingly, 15.4 grams of C. P. propylene were absorbed at 25° C. in 362.8 g. of 91% sulfuric acid (from the vacuum reboilers of a commercial ethanol plant) and this product (4A) was tested as a foam repressant. The data are shown in Table IV.

Table IV
EQUIVALENCE OF OLEFIN AND ALCOHOL

| Product ml. Product/100 ml. 48% Acid | Control | 4A 1 |
|---|---|---|
| Temperature, ° C. | Foam Height, ml. | |
| 140 | >500 | 140 |
| 145 |  | 135 |
| 150 |  | 130 |
| 155 |  | 120 |
| 160 |  | 120 |
| 165 |  | 110 |
| 170 |  | 105 |

It is seen that this product of about 4.1 g. propylene per 100 ml. 91% acid is fully the equivalent of its counterpart (3B) prepared with isopropanol.

EXAMPLE V

As a further example of the equivalence of alcohol and olefin-water systems, a product (5A) was prepared by mixing 10 ml. n-propyl alcohol in 100 ml. 91% acid plant product. The test data are shown in Table V.

Table V

| Product | Control | 5A |
|---|---|---|
| ml. Product/100 ml. 48% Acid | | 1 |
| Temperature, °C. | Foam Height, ml. | |
| 140 | >500 | 175 |
| 145 | | 175 |
| 150 | | 160 |
| 155 | | 140 |
| 160 | | 130 |
| 165 | | 125 |
| 170 | | 130 |

These data coupled with those in Example III and IV reveal the equivalence of propylene, isopropanol and n-propyl alcohol in the 91% acid system.

EXAMPLE VI

Other alcohols were examined to see if they would function satisfactorily in these systems. The products shown below were prepared at room temperature.

6A. 10 ml. ethyl alcohol/100 ml. 91% acid plant product
6B. 10 ml. butanol-2/100 ml. 91% acid plant product
6C. 10 ml. n-butanol/100 ml. 91% acid plant product
6D. 10 ml. iso-butanol/100 ml. 91% acid plant product
6E. 10 ml. oxo-amyl alcohol/100 ml. 91% acid plant product The test data are summarized in Table VI.

Table VI

| Product | Control | 6A | 6B | 6C | 6D | 6E |
|---|---|---|---|---|---|---|
| ml. Product/100 ml. 48% Acid | | 2 | 2 | 2 | 2 | 2 |
| Temperature, °C. | Foam Height, ml. | | | | | |
| 140 | >500 | >500 | 200 | 150 | >500 | 100 |
| 145 | | | 500 | >500 | | 115 |
| 150 | | | 490 | | | 115 |
| 155 | | | 490 | | | 120 |
| 160 | | | 470 | | | 125 |
| 165 | | | 445 | | | 125 |
| 170 | | | 450 | | | 130 |

These data show that the butyl alcohols are unsatisfactory as is ethanol. However, the oxo-amyl alcohol is satisfactory. Since the oxo process gives rise to mixed isomers it is expected on the basis of analogy with the propylene-isopropanol-n-propanol system that a C₅ olefin stream could be used in place of the amyl alcohol to produce a suitable oxidized amyl sulfate extract. Consequently it can be generalized that aliphatic alcohols or the corresponding olefins having an odd number of at least three carbon atoms are suitable for the purposes of the present invention.

Having described the general nature and various embodiments and uses of the invention, its scope is particularly pointed out in the appended claims.

What is claimed is:

1. In a process for reconcentrating spent dilute sulfuric acid to a strength of at least 65%, said spent acid being the result of previous contacting of an unsaturated hydrocarbon with the sulfuric acid at an acid strength of at least 85% and subsequent dilution of the acid with water, the improvement in reducing the foaming tendency of the dilute sulfuric acid during reconcentration which comprises adding thereto as an antifoamant a foam-repressing amount of an oxidized alkyl sulfate extract separately prepared by reacting 100 parts of sulfuric acid of 82 to 96% strength with 5 to 30 parts of a reagent selected from the group consisting of $C_3$ and $C_5$ aliphatic alcohols, propylene, amylene and mixtures thereof, and heating the resulting antifoamant-containing spent dilute acid to evaporate water therefrom.

2. A process according to claim 1 wherein the spent acid is the result of a previous contacting with ethylene.

3. A process according to claim 1 wherein the antifoamant is a reaction product of sulfuric acid and propylene.

4. A process according to claim 1 wherein the antifoamant is a reaction product of contacting 100 parts of sulfuric with 10 to 20 parts of a propyl alcohol at about 15 to 25° C.

5. In combination with an ethanol synthesis process wherein ethylene is absorbed by countercurrent contact with 85 to 99% sulfuric acid in several stages attended by the formation of surface active carbonaceous impurities, ethanol is recovered from the resulting ethanol extract by hydrolysis with the aid of added water and by stripping of the alcohol from the resulting dilute aqueous extract, and the resulting dilute spent acid is reconcentrated by evaporation of water therefrom in the presence of said carbonaceous impurities, the improvement of evaporating said water from the spent acid in the presence of about 1 to 5 percent of an oxidized alkyl sulfate extract prepared by reacting 100 parts of sulfuric acid of 82 to 96% strength with 5 to 30 parts of a reagent selected from the group consisting of $C_3$ and $C_5$ aliphatic alcohols, proylene, amylenes and mixtures thereof.

6. A process according to claim 5 wherein said ethanol extract is diluted to an acid strength of about 45 to 55% prior to removal of ethanol therefrom and wherein the resulting spent dilute acid is reconcentrated to at least 65% strength by reboiling at substantially atmospheric pressure.

7. A process according to claim 6 wherein said oxidized alkyl sulfate extract is the reaction product of about 90% sulfuric acid and propylene and is added to said spent dilute acid in a concentration of about 1 to 2% based on the dilute acid.

8. A process according to claim 6 wherein said oxidized alkyl sulfate extract is the reaction product of about 90% sulfuric acid and isopropyl alcohol.

9. A process for making an oxidized alkyl sulfate extract having anti-foaming properties which comprises mixing 100 parts of sulfuric acid of about 85 to 96% strength with about 5 to 30 parts of an aliphatic reagent selected from the group consisting of $C_3$ and $C_5$ aliphatic alcohols, propylene, amylenes and mixtures thereof, and maintaining the mixture at an oxidative reaction temperature for a period of about 1 to 15 hours, a reaction period of at least 2 hours being required at 25° C. in the case of about 90% acid and correspondingly longer periods being required in the case of weaker acids and lower temperatures.

10. A process according to claim 9 wherein the sulfuric acid is of about 88 to 93% strength, the aliphatic reagent is a propyl alcohol and the reaction temperature is between about 15 and 25° C.

11. An anti-foaming composition prepared by the process of claim 9.

12. An anti-foaming composition prepared by the process of claim 10.

References Cited in the file of this patent

UNITED STATES PATENTS

| 1,988,611 | Shiffler et al. | Jan. 22, 1935 |
| 2,099,814 | Larchar | Nov. 23, 1937 |
| 2,190,501 | Brooks | Feb. 13, 1940 |
| 2,497,959 | Robey et al. | Feb. 21, 1950 |